Jan. 6, 1953

C. F. VAN HOOK 2,624,522

REEL STAND

Filed July 2, 1947

3 Sheets-Sheet 1

INVENTOR.
CHARLES F. VAN HOOK
BY
George T. Gill

Jan. 6, 1953     C. F. VAN HOOK     2,624,522
REEL STAND
Filed July 2, 1947     3 Sheets-Sheet 2
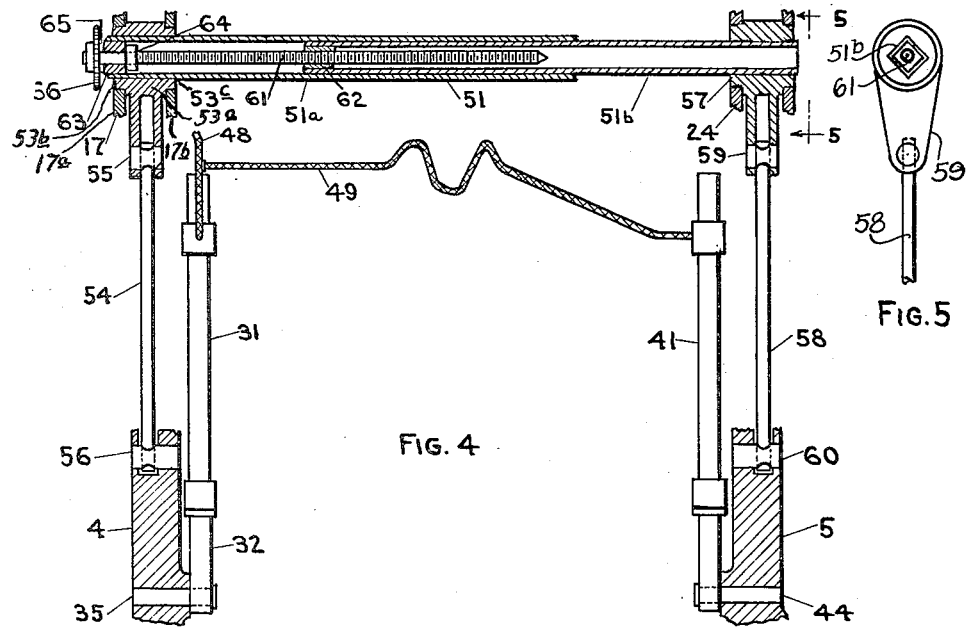
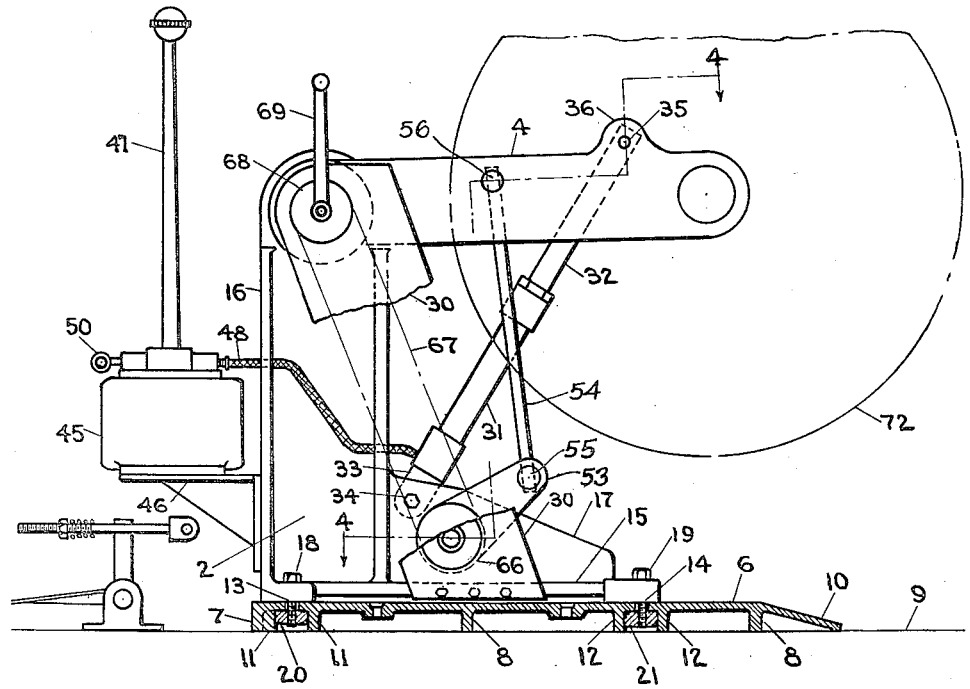
INVENTOR.
CHARLES F. VAN HOOK
BY
George T. Gill Jan. 6, 1953   C. F. VAN HOOK   2,624,522
REEL STAND Filed July 2, 1947   3 Sheets-Sheet 3

INVENTOR.
CHARLES F. VAN HOOK
BY
George T. Gill

Patented Jan. 6, 1953

2,624,522

UNITED STATES PATENT OFFICE 2,624,522

REEL STAND

Charles F. Van Hook, Paterson, N. J.

Application July 2, 1947, Serial No. 758,681

8 Claims. (Cl. 242—58)

1

The invention herein disclosed relates to a reel stand that is particularly suitable for wire rope and cable.

An object of the invention is to provide a reel stand of the kind mentioned that combines a takeup and a rewinder. Another object of the invention is to provide a reel stand of this kind that does not require a shaft for supporting a spool. A further object of the invention is to provide a reel stand having a lift mechanism that may be actuated by low manual effort and which quickly and efficiently raises or lowers a spool or reel. Another object of the invention is to provide a reel stand of this kind which permits of a wide range of reel speeds in a machine takeup or rewinder. An additional object of the invention is to provide a reel stand of this kind that is comparatively inexpensive to manufacture.

The foregoing objects and certain advantages that will hereinafter appear are realized in the reel stand embodying the invention that is disclosed in the accompanying drawings and described in detail below, from which description a clear understanding of the invention may be had.

Figure 1:
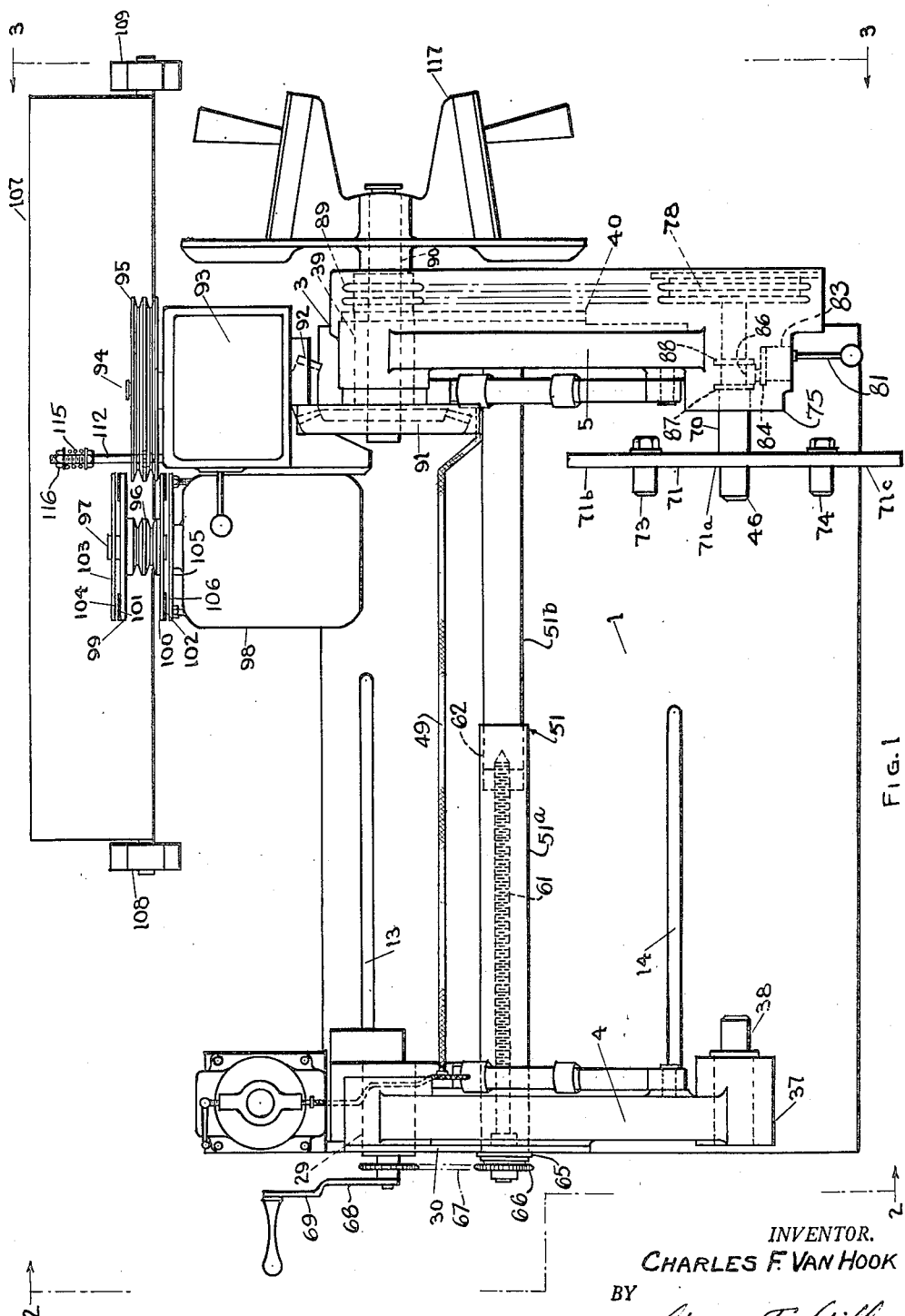
Figure 3:
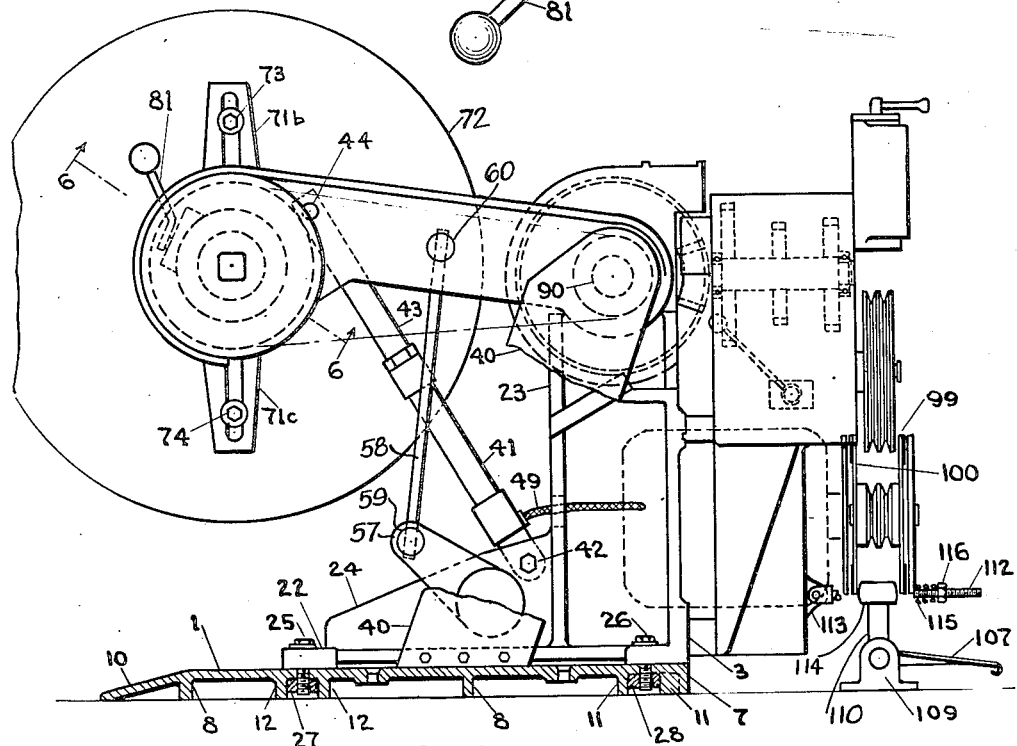

The drawings include:

Fig. 1 which is a plan of a reel stand embodying the invention;

Fig. 2 which is a side elevation of the same, with the base in section, taken from the plane 2—2 of Fig. 1;

Fig. 3 which is also a side elevation of the same, with the base in section, taken from the plane 3—3 of Fig. 1 with the coiling head removed;

Fig. 4 which is a fragmentary sectional plan taken on the irregular line 4—4 of Fig. 2;

Fig. 5 which is a transverse section taken on the line 5—5 of Fig. 4; and

Figure 6:
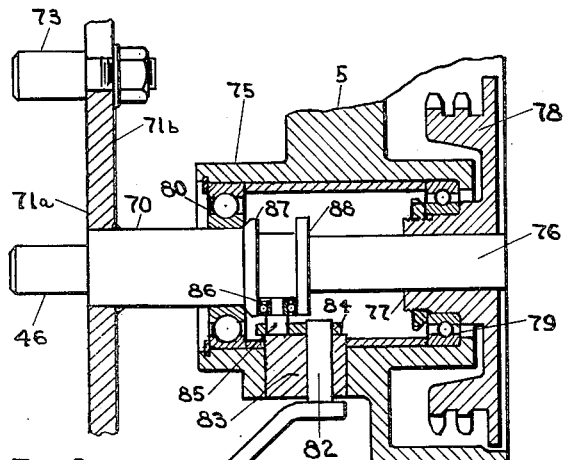

Fig. 6 which is a fragmentary section taken on the line 6—6 of Fig. 3.

In general, the reel stand illustrated in the drawings includes a base 1 on which all of the mechanism is mounted, two spaced, upright frames or frame elements 2 and 3, two reel or spool supporting levers 4 and 5 which rotatably support a spool, and the operating mechanism which rotates a takeup spool and a coiling head. The levers 4 and 5 are pivotally secured to the frame elements 2 and 3 and hydraulic mechanism is provided to move the levers about their pivotal connections to raise and lower a reel or spool.

The base 1 desirably consists of a cast metal plate 6 having a supporting end flange 7 and reenforcing and supporting, intermediate, spaced longitudinal ribs 8 formed integral therewith. At the reel or spool side, the plate inclines toward the floor 9 as indicated at 10. In addition to the ribs 8, two pair of longitudinal ribs 11 and 12, form nut retaining channels below bolt slots 13 and 14 cut through the base.

The upright frame 2 includes a pedestal 15, a stanchion 16 and a reenforcing web 17 extending from the stanchion to the pedestal. Bolts 18 and 19 extend through openings through the pedestal, and the slots 13 and 14 respectively through the base 1. These bolts are threaded into elongated nuts 20 and 21, respectively, received in the bolt channels formed between the two pair of ribs 11 and 12. The nuts 20 and 21 are slidable in the channels in which they are received so that when the bolts 18 and 19 are loosened, the frame 2 may be moved toward and away from the frame 3 to accommodate reels or spools of different widths. Manually operated mechanism, to be hereinafter described, is provided for effecting movement of the frame 2 along the base toward and away from the frame 3.

The upright frame 3 is similar to the upright frame 2 in that it includes a pedestal 22, a stanchion 23 and a reenforcing web 24 extending from one edge of the stanchion to the pedestal. In like manner, the pedestal 22 of the frame 3 is secured to the base 1 by bolts 25 and 26 extending through holes in the pedestal, aligned holes in the base 1 and threaded into nuts 27 and 28 received in the channels formed by the ribs 12 and 11 respectively. Desirably, the frame 3 is fixed in position on the base, although it may be made movable in like manner as the frame 2.

These upright frame members support the operating mechanism and the spool-supporting levers 4 and 5. At one end, the lever 4 is pivotally mounted on a pivot shaft 29, at the upper end of the stanchion 16 of the frame 2. The pivot shaft 29 is fixed to the stanchion 16 and at its outer end to a strut 30 bolted to and extending from the pedestal 15. A hydraulic ram, consisting of a cylinder 31 and a plunger or ram rod 32 links the lever 4 and the frame 2. The head end of the cylinder 31 has a bracket 33 formed thereon which is pivotally mounted on a pivot pin 34 secured in the web 17 of the frame, and the end of the plunger 32 is pivotally mounted on a pivot pin 35 fixed in a lug 36 formed integral with the lever. Through this hydraulic ram, the lever 4 is raised and lowered as will be hereinafter described. At the free end of the lever 4, there is a boss 37 from the end of which there extends, laterally of the plane of the lever and in the direction of the frame 3, a fixed, horizontal spool-supporting pintle 38.

The lever 5 is, in like manner, pivotally mounted at one end on a pivot shaft 39 fixed in the upper end of the stanchion 23 of the frame 3 and a strut 40 bolted to and extending from the pedestal 22. The pivot shaft 39 is co-axial with the pivot shaft 29. A hydraulic ram forms an extensible link between the lever and the frame. The hydraulic ram consists of a cylinder 41, pivotally mounted at the head end thereof on a pivot pin 42, fixed in and extending from the web 24 of the frame 3, and a plunger 43 extending from the cylinder and pivotally secured at its outer end on a pivot pin 44 extending laterally from the lever 5. At the free end of the lever 5, there is a rotatably and slidably mounted spool-supporting pintle 46.

The hydraulic mechanism for raising and lowering the levers 4 and 5 includes the hydraulic rams above described and a combined pump and fluid reservoir 45. The pump and reservoir are a kind well known in the art and available on the open market and the details thereof form no part of this invention. In consequence, the description thereof will omit the details of construction and be confined to the function and operation as related to raising and lowering the levers 4 and 5.

The pump-reservoir unit 45 is mounted on a bracket 46 secured to the stanchion 16 of the frame 2. The pump is provided with a relatively long actuating handle 47 through which the pump is manually operated to draw fluid from the reservoir and deliver it, under pressure, to the head ends of the hydraulic rams. For this purpose, a flexible fluid line or hose 48 connects the unit 45 and the head end of the cylinder 31. A branch flexible line 49 connects the line 48 and the head of the cylinder 41 so that fluid is delivered to or flows from the two cylinders simultaneously. For the purpose of relieving the fluid in the cylinders, the unit 45 is provided with a hand operated valve 50 which when opened, opens the line 48, and, in consequence, the cylinders to the reservoir. To raise the levers 4 and 5, the valve 50 is closed and the handle 47 is manually actuated. The pump thus draws fluid from the reservoir and delivers the fluid, under pressure to the rams, a check valve prevents a reverse flow of the fluid. The fluid, under pressure, in the cylinders 31 and 41 acts upon the plungers 32 and 43 which move longitudinally to raise the levers about their pivotal connections to the frames 2 and 3. When it is desired to lower the levers, the valve 50 is opened and the pressure on the fluid in the cylinders is relieved. The weight of the arms force the plungers into the cylinders and the fluid back into the reservoir.

Where two or more hydraulic rams, supplied from a common pumping source, must act in unison or synchronism, there must be a governing arrangement by which either friction or loading or both are neutralized. In the arrangement illustrated in the drawings, this is effected by forcibly equalizing the movement of the hydraulic rams through a positive mechanical connection between the levers 4 and 5. This connection includes a two-element, hollow, square, telescopic shaft 51 extending between the frames 2 and 3. At one end, the shaft 51 is received in the web 17 of the frame, and at the opposite end in the web 24 of the frame 3.

At the frame 2, there is fixed on the shaft 51, the hub 53a of a bifurcated crank 53. The hub 53a extends between, and has end bushings 53b and 53c journaled in, spaced elements 17a and 17b of the web 17. Between the arms of the bifurcated crank, one end of a connecting rod 54 is received and pivotally secured to the crank by a pivot pin 55. The opposite end of the connecting rod is pivotally secured to the lever 4 by a pivot pin 56. A like crank 57, journaled in like manner between spaced elements of the web 24, is secured on the shaft 51 at the frame 3, and a connecting rod 58 is pivotally secured at one end to the crank by a pivot pin 59 and at the other end to the lever 5 by a pivot pin 60. Thus, the levers 4 and 5 are forcibly caused to move in synchronism through a positive, mechanical connection therebetween.

As previously stated, manually operated mechanism is provided for effecting movement of the frame 2, along the base, toward and away from the frame 3. This mechanism includes a screw shaft 61 extending through the element 51a of the two-element, telescopic shaft 51, and a nut 62, secured, as by welding, in the end of the element 51b of the shaft 51, into which nut the screw shaft is threaded. The screw shaft extends through the end of the element 51a of the shaft 51 and is journaled in a bearing block 63 securely fixed in the end of the shaft element 51a. A collar 64 fixed on the screw shaft 61, on one side of the bearing block, and the hub 65 of a sprocket 66, fixed on the screw shaft on the other side of the bearing block, prevent axial movement of the screw shaft relative to the bearing block and the frame element 2. A chain 67 connects the sprocket 66 with a sprocket 68 rotatably mounted on a reduced extension of the pivot shaft 29. The sprocket 68 is rotated manually by a hand crank 69 fixed on the end thereof. Thus, when the bolts 18 and 19 are loosened, the frame 2 may be moved toward or away from the frame 3 by rotating the hand crank 69 in the proper direction.

The pintle 46 constitutes the reduced end of a shaft 70. This shaft carries, fixed thereto for rotation therewith, a spool-driving element 71. Through this spool-driving element, a spool 72, supported on the pintles 38 and 46 is driven, as a takeup, by driving mechanism to be hereinafter described. The spool-driving element consists of a central portion 71a fixed on the shaft 70, oppositely extending radial arms 71b and 71c, each having longitudinal slots therein, and a pair of dog pins 73 and 74, one extending through the slot in each radial arm and adjustable longitudinally of the slots therein.

The shaft 70 extends into the boss 75 on the end of the lever 5 and has a squared end portion 76 that is slidably received in a complementary hole through the hub 77 of a double sprocket 78. The hub 77 is journaled in a ball bearing 79 at one end of the boss 75 and the shaft is journaled in a ball bearing 80 at the other end of the boss 75. Through a manually actuated lever 81, the shaft 70 is shifted longitudinally thereof, to extend the pintle 46 and drive element 71 into supporting and driving relation, or to retract them from, a spool axially aligned with the pintle. The lever 81 is fixed on the end of a shaft 82 extending through and journaled in a bearing block 83 fixed in the side of the boss 75. On the inner end of the shaft 82, there is fixed to the shaft a lever 84 that carries a laterally extending pin 85. Rotatably mounted on the pin 85, there is a shifting element 86 that extends between circumambient, radial flanges 87 and 88 formed integral with the shaft 70 intermediate the ends thereof. By moving the lever 81, the shifting element 86 engages one or the other of the flanges 87 or 88 and moves the shaft 70 longitudinally thereof.

The double sprocket 78 is connected by a pair of chains to a double sprocket 89 fixed on a drive shaft 90. This drive shaft 90 is journaled in, co-axial with, and extends beyond both ends of the pivot shaft 39. On the inner end of the drive shaft 90, there is fixed to the shaft a bevel gear 91. The gear 91 meshes with a bevel pinion gear 92 that is secured on a shaft which constitutes the output from a three-speed, slide-gear transmission 93 of well known construction. The input shaft 94 of the transmission 93 has fixed thereon a V pulley 95. This pulley 95 is connected by a belt to a V pulley 96, rotatably and slidably mounted on the shaft 97 of an electric motor 98.

The pulley 96 has a pair of flanges 99 and 100 formed integral therewith, one at each end thereof. On the outside of the flange 99, there is an annular friction lining 101, and on the outside of the flange 100, there is a like, annular friction lining 102. The motor shaft 97 has fixed thereon, adjacent the flange 99, a disc 103 having a friction lining 104 facing the friction lining 101 on the flange 99. Another disc 105 is fixed to the frame of the motor 98 and has a friction lining 106 facing the lining 102 on the flange 100. By shifting the pulley 96 so that the lining 101 on the flange 99 engages the lining 104 on the disc 103, the pulley 96 is connected to the motor for rotation therewith, and through the train of mechanism just described, drives the spool-driving element 71. If the pulley 96 be shifted so that the lining 102 on the flange 100 engages the lining 106, a braking action is effected and the spool-driving element 71 is stopped or held stationary.

For shifting the pulley 96 into driving or braking position, there is provided a foot treadle 107. The foot treadle is pivotally mounted in end brackets 108 and 109. From the foot treadle, a lever 110 extends and carries a rotatable shifting element 111 that is positioned between the flanges 99 and 100 of the pulley 96. The foot treadle is resiliently urged toward the lifted position in which the pulley 96 is positioned to engage the stationary disc 105. To this end a rod 112 is pivotally secured to a fixed bracket 113 and extends through a lever 114 secured to and extending vertically from the foot treadle. A spring 115 surrounds the rod 112 and acts between the lever 114 and a nut 116 threaded on the rod.

The end of the drive shaft 90 is arranged to receive a coiling head 117. Thus, the coiling head, of conventional design, is also driven by the motor 98.

From the foregoing description of the reel stand illustrated in the drawing, it will be apparent to those skilled in the art that by this invention there is provided a combined takeup and rewind that is comparatively inexpensive to manufacture; that is shaftless and so eliminates the hazards and cumbersomeness of handling reel shafts; that has a simple lift actuated by low hand effort; that allows of a wide range of speeds; and that is efficient in operation.

It will be obvious that various changes may be made by those skilled in the art in the details of the reel stand illustrated in the drawings and described in detail above within the principle and scope of the invention as expressed in the appended claims.

I claim:

1. In a mechanism of the kind described, the combination comprising a pair of spaced, upright frame elements, a lever pivoted at one end to one of said frame elements, a second lever pivoted at one end of the other frame element co-axial with the pivotal connection of said first mentioned lever, hydraulic mechanism for effecting movement of the levers about their pivotal connections to the frame elements including a pair of hydraulic rams, one of said rams linking one of said levers to its respective frame-element and the other of said rams linking the other of said levers to its frame element, a hydraulic pump for supplying fluid under pressure to the rams to lift the levers, a reservoir for supplying fluid to the pump and receiving fluid from the rams, and means for effecting synchronous movement of the levers.

2. In a mechanism of the kind described, the combination comprising a pair of spaced, upright frame elements, a lever pivoted at one end to one of said frame elements, a second lever pivoted at one end to the other frame element co-axial with the pivotal connection of said first mentioned lever, hydraulic mechanism for effecting movement of the levers about their pivotal connections to the frame elements including a pair of hydraulic rams, one of said rams linking one of said levers to its respective frame element and the other of said rams linking the other of said levers to its frame element, a hydraulic pump for supplying fluid under pressure to the rams to lift the levers, a reservoir for supplying fluid to the pump and receiving fluid from the rams, and a positive mechanical connection between the levers for effecting synchronous movement thereof.

3. In a mechanism of the kind described, the combination comprising a pair of spaced, upright frame elements, a lever pivoted at one end to one of said frame elements, a second lever pivoted at one end to the other frame element co-axial with the pivotal connection of said first mentioned lever, hydraulic mechanism for effecting movement of the levers about their pivotal connections to the frame elements including a pair of hydraulic rams, one of said rams linking one of said levers to its respective frame element and the other of said rams linking the other of said levers to its frame element, a hydraulic pump for supplying fluid under pressure to the rams to lift the levers, a reservoir for supplying fluid to the pump and receiving fluid from the rams, and a positive mechanical connection between the levers for effecting synchronous movement thereof comprising a shaft extending between the levers, a crank adjacent each lever fixed to said shaft for rotation therewith, and a connecting rod extending between each crank and the adjacent lever and pivotally connected thereto.

4. In a mechanism of the kind described, the combination comprising a pair of spaced, upright frame elements relatively movable toward and away from each other, a lever pivoted at one end to one of said frame elements, a second lever pivoted at one end to the other element co-axial with the pivotal connection of said first mentioned lever, hydraulic mechanism for effecting movement of the levers about their pivotal connections with the frame elements including a pair of hydraulic rams, one of said rams linking one of said levers to its respective frame element and the other of said hydraulic rams linking the other lever to its frame element, a hydraulic pump for supplying fluid under pressure to the rams to lift the levers, a reservoir for supplying fluid to the pump and receiving fluid from the rams, and means for effecting synchronous movement of the levers.

5. In a mechanism of the kind described, the combination comprising a pair of spaced, upright frame elements relatively movable toward and away from each other, means for moving the frame elements toward and away from each other including a hollow two element telescopic shaft extending between the frame elements, a rotatable screw shaft extending into said shaft from the end of one element thereof, and a nut fixed within the other element of the shaft engaging the screw, a lever pivoted at one end to one of said frame elements, a second lever pivoted at one end to the other element co-axial with the pivotal connection of said first mentioned lever, hydraulic mechanism for effecting movement of the levers about their pivotal connections with the frame elements including a pair of hydraulic rams, one of said rams linking one of said levers to its respective frame element and the other of said hydraulic rams linking the other lever to its frame element, a hydraulic pump for supplying fluid under pressure to the rams to lift the levers, a reservoir for supplying fluid to the pump and receiving fluid from the rams, and means for effecting synchronous movement of the levers.

6. In a mechanism of the kind described, the combination comprising a pair of spaced, upright frame elements relatively movable toward and away from each other, means for moving the frame elements toward and away from each other including a hollow two element telescopic shaft extending between the frame elements, a rotatable screw shaft extending into said shaft from the end of one element thereof, and a nut fixed within the other element of the shaft engaging the screw, a lever pivoted at one end to one of said frame elements, a second lever pivoted at one end to the other element co-axial with the pivotal connection of said first mentioned lever, hydraulic mechanism for effecting movement of the levers about their pivotal connections with the frame elements including a pair of hydraulic rams, one of said rams linking one of said levers to its respective frame element and the other of said hydraulic rams linking the other lever to its frame element, a hydraulic pump for supplying fluid under pressure to the rams to lift the levers, a reservoir for supplying fluid to the pump and receiving fluid from the rams, and means for effecting synchronous movement of the levers comprising a crank adjacent each lever fixed to said telescopic shaft for rotation therewith, and a connecting rod extending between each crank and the adjacent lever and pivotally connected thereto.

7. In a mechanism of the kind described, the combination comprising a pair of spaced, upright frame elements, a lever pivoted at one end to one of said frame elements, another lever pivoted at one end to the other of said frame elements co-axial with the pivotal connection of the first mentioned lever, spool-supporting pintles extending from said levers adjacent the free ends thereof and arranged co-axially with one of said spool-supporting pintles, a drive shaft arranged co-axially with the pivotal connection of the lever carrying said spool-driving element, a drive connection between said drive shaft and said spool-driving element, and hydraulic mechanism for moving the levers about their pivotal connections to the frame elements including a pair of hydraulic rams, one of said rams linking one of said levers to its respective frame element and the other of said hydraulic rams linking the other lever to its frame element, a hydraulic pump for supplying fluid under pressure to the rams to lift the levers, a reservoir for supplying fluid to the pump and receiving fluid from the rams, and means for effecting synchronous movement of the levers.

8. In a mechanism of the kind described, the combination comprising a pair of spaced, upright frame elements relatively movable toward and away from each other, means for moving the frame elements toward and away from each other, a lever pivoted at one end to one of said frame elements, another lever pivoted at one end to the other of said frame elements co-axial with the pivotal connection of the first mentioned lever, spool-supporting pintles extending from said levers adjacent the free ends thereof and arranged co-axially, a rotatably mounted spool-driving element carried by one of said levers and arranged co-axially with one of said spool-supporting pintles, the spool-driving element being shiftable axially to engage in driving relation with a spool arranged co-axial with the pintle, a drive shaft arranged co-axially with the pivotal connection of the lever carrying said spool-driving element, and a drive connection between said drive shaft and said spool-driving element.

CHARLES F. VAN HOOK.

REFERENCES CITED

The following references are of record in the file of this patent:

UNITED STATES PATENTS

| Number | Name | Date |
|---|---|---|
| 1,775,707 | Van Hook | Sept. 16, 1930 |
| 1,812,742 | Fallot | June 30, 1931 |
| 1,832,446 | Boe | Nov. 17, 1931 |
| 2,196,000 | Richardson | Apr. 2, 1940 |
| 2,405,637 | Behrens | Aug. 13, 1946 |
| 2,499,562 | Behrens | Mar. 7, 1950 |

FOREIGN PATENTS

| Number | Country | Date |
|---|---|---|
| 699,866 | France | Dec. 17, 1930 |